United States Patent
Chen et al.

(10) Patent No.: US 7,068,702 B2
(45) Date of Patent: Jun. 27, 2006

(54) METHOD AND APPARATUS FOR SELECTIVE COLLISION AVOIDANCE FREQUENCY HOPPING

(75) Inventors: Hung-Kun Chen, Hsinchu (TW); Kwang-Cheng Chen, Palo Alto, CA (US)

(73) Assignee: MEDIATEK Incorporation, Hsinchu (TW)

( * ) Notice: Subject to any disclaimer, the term of this patent is extended or adjusted under 35 U.S.C. 154(b) by 973 days.

(21) Appl. No.: 09/759,677

(22) Filed: Jan. 12, 2001

(65) Prior Publication Data

US 2002/0191677 A1 Dec. 19, 2002

(51) Int. Cl.
*H04B 1/69* (2006.01)
*H04B 1/707* (2006.01)
*H04B 1/713* (2006.01)

(52) U.S. Cl. .................................................... 375/132

(58) Field of Classification Search ........ 375/130–153; 370/280
See application file for complete search history.

(56) References Cited

U.S. PATENT DOCUMENTS

| | | | | |
|---|---|---|---|---|
| 5,541,954 A | * | 7/1996 | Emi | 375/133 |
| 5,970,055 A | * | 10/1999 | Park et al. | 370/280 |
| 6,549,784 B1 | * | 4/2003 | Kostic et al. | 455/501 |
| 6,845,123 B1 | * | 1/2005 | Nyberg et al. | 375/133 |

\* cited by examiner

*Primary Examiner*—Chieh M. Fan
*Assistant Examiner*—Curtis Odom
(74) *Attorney, Agent, or Firm*—J.C. Patents

(57) ABSTRACT

A method and an apparatus for determining a hopping sequence for selecting a channel from a plurality of channels divided into a plurality of partitions to reduce probability of data collision in a frequency hopping spread spectrum (FHSS) communication system are provided. The communication system stores multiple predetermined partition sequences and receives a first sequence generated by a convention sequence generator.

76 Claims, 10 Drawing Sheets

800 measuring Np data collision ratios respectively corresponding to Np partitions, responsive to a RF signal, the Np data collision ratios having value of R(i), I being from 1 through Np and denoting an Ith partition

801 selecting a partition sequence from Q partition sequences, the partition sequence having a smallest value of a selection value H(p), wherein the selection value is a summation of R(i)*number of occurrence of the ith partition in each of Q partition sequences, p being from 1 through Q and denoting pth partition sequence

802 mapping the first sequence of M channels to the selected partition sequence to produce a second sequence of M channels

803 responsive to a control signal, selecting one of the first sequence and the second sequence as the hopping sequence

METHOD AND APPARATUS FOR SELECTIVE COLLISION AVOIDANCE FREQUENCY HOPPING

FIELD OF THE INVENTION

The present invention relates to a FHSS communication system and, more particularly, to a FHSS (Frequency-Hopping Spread Spectrum) communication system with an optimal hopping sequence.

BACKGROUND OF THE INVENTION

The idea of spread spectrum was first used to combat intentional jamming and interception during War World II. Commercially, a great part of spread spectrum communication system operate in an unlicensed band with sufficient bandwidth to perform communication. A suitable band is Industrial Scientific Medicine (ISM) band at 2.4 GHz, which is globally available. This band provides 83.5 MHz of radio spectrum. It has been adopted by Bluetooth® Special Interest Group (SIG) and IEEE Std 802.15.1, the first part of Wireless Personal Area Network (WPAN) specifications. Being designed as a low cost cable replacement, it can provide a unified and convenient wireless interface for applications within the distance of personal area, e.g. 10 meters. In order to avoid data collision by ambient interference, frequency hopping (FH) technique is adopted.

FHSS is one of the prevailing spread spectrum schemes and involves rapidly changing the carrier frequency of the narrow band data signal. The ISM band, however, is an unlicensed shared band that is exposed to radiation from other systems operating concurrently. IEEE Std 802.11(b), the Wireless Local Area Network (WLAN) specifications and its higher-speed extension, is another wireless communication specification in this band. WLAN is targeted at high-speed data exchange in the local area network (LAN) environment. At the same time, garage door remote control and cordless telephone are in the same band. This brings upgrading down of the transmission rate, even paralysis of the communication system The co-existence situation has drawn so much attention that a task group, TG2, in IEEE 802.15 is formed to study the modeling of performance degradation and the possible solutions.

Adaptive frequency hopping (AFH) has been proposed to solve the co-existent problem. AFH removes the interfered channels from the hopping sequence and then hops to the clean channels. Since a signal of IEEE 802.11(b) spans 22 MHz of bandwidth, Bluetooth® devices will have to remove 22 channels, each having 1 MHZ, to fully avoid frequency overlap with 802.11(b) devices. One known problem of AFH is that Federal Communications Commission (FCC) has placed a restriction on the channel usage of FH systems in the 2.4 GHz band. A system must have at least 75 channels and the occupation time of each channel must not exceed 0.4 second within 30 seconds. It implies that at least 75 channels should be kept and used uniformly to achieve full-time usage. Removal of more than 4 channels occupied by an IEEE 802.11b device from the 79 hopping channels of Bluetooth® would become infeasible. This restriction applies to Bluetooth® type 1 and type 2 devices but not to type 3 devices due to their relatively lower transmission power. Moreover, when there are reserved time slots for priority information transmitted or received, it is not wise to apply the same rule on them.

Therefore, there exists a need for a method and an apparatus for implementing adaptive hopping without violating the restrictions and implementing it selectively, depending on whether the information type is prioritized.

In one aspect of the present invention, a method for determining a hopping sequence for selecting a channel from M channels divided into Np partitions to reduce probability of data collision from interference in a FHSS communication system is provided. One host apparatus in the FHSS communication system stores Q predetermined partition sequences and receives a first sequence of the M channels. The method includes the steps of (1) measuring Np data collision ratios respectively corresponding to Np partitions, responsive to a RF signal, the Np data collision ratios having value of R(i), i is from 1 through Np and denotes an ith partition; (2) selecting a partition sequence from Q partition sequences, the partition sequence having a smallest value of a selection function H(p), wherein the selection function is a summation of R(i)* relative frequency of occurrence of the ith partition in each of Q partition sequences, p being from 1 through Q and denoting pth partition sequence; (3) mapping the first sequence of M channels to the selected partition sequence to produce a second sequence of M channels; and (4) responsive to a control signal, selecting one of the first sequence and the second sequence as the hopping sequence.

In another aspect of the present invention, an apparatus for determining a hopping sequence for selecting a channel from M channels divided into Np partitions to reduce probability of data collision from interference in a FHSS communication system is provided. The host apparatus stores Q predetermined partition sequences and receives a first sequence of M channels. The apparatus includes a measurement circuit for measuring Np data collision ratios respectively corresponding to Np partitions, responsive to a RF signal, the Np data collision ratios has value of R(i), i being from 1 through Np and denotes an ith partition; a first selector for selecting a partition sequence from Q partition sequences, the partition sequence having a smallest value of a selection function H(p), wherein the selection function is a summation of R(i)* relative frequency of occurrence of the ith partition in each of Q partition sequences, p being from 1 through Q and denoting pth partition sequence; a mapping circuit for mapping the first sequence of M channels to the selected partition sequence to produce a second sequence of M channels; and a second selector, responsive to a control signal, for selecting one of the first sequence and the second sequence as the hopping sequence.

BRIEF DESCRIPTION OF THE DRAWING

FIG. 8 illustrates a flow diagram of method 800 in accordance with an embodiment of the present invention;

DETAILED DESCRIPTION OF THE EMBODIMENTS

Figure 1:
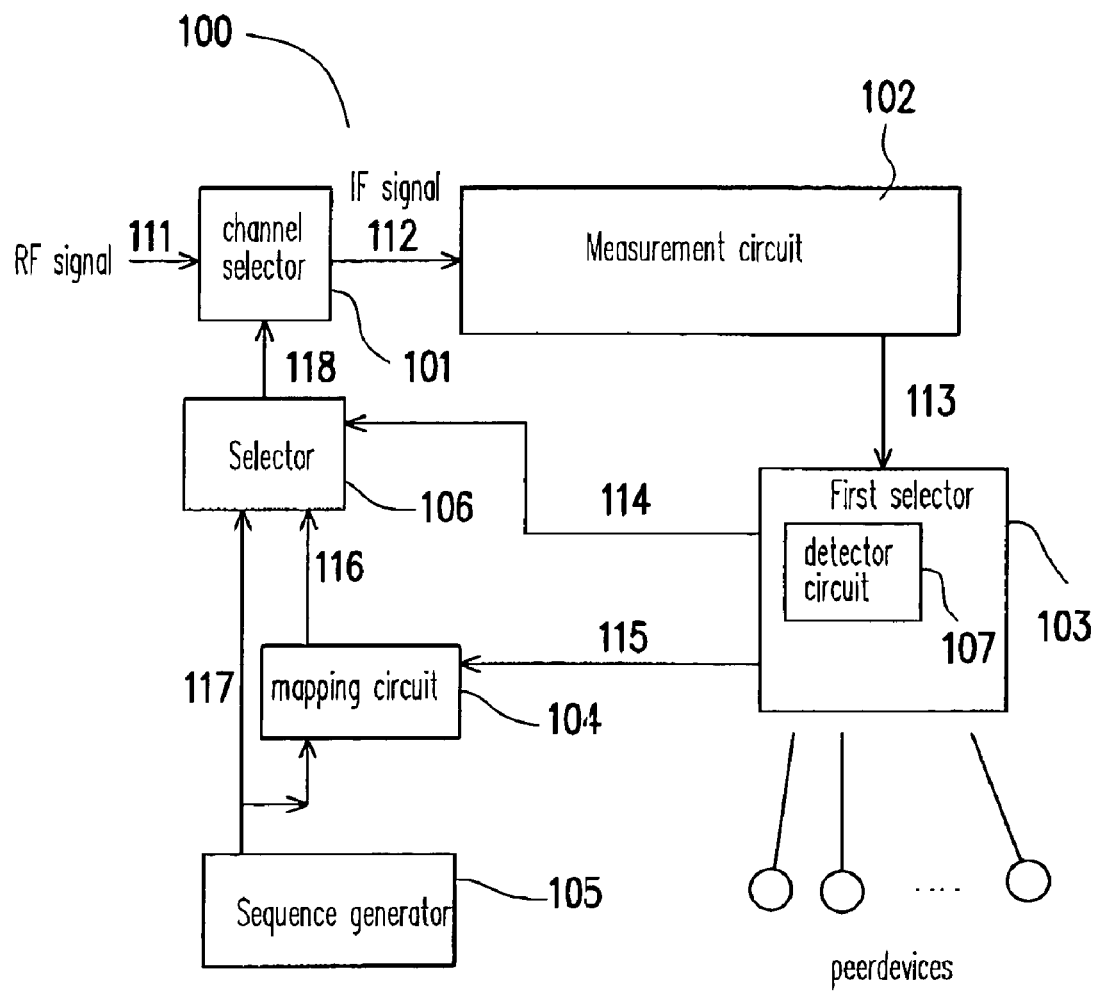
FIG. 1 illustrates a block diagram of a host apparatus in accordance with an embodiment of the present invention.

FHSS communication systems should be interpreted herein to comprehend all spread spectrum communication systems adopting frequency hopping technology, including frequency hopping spread spectrum multiple access (FH-SSMA) communication systems. For simplicity, the present invention is described mainly in terms of Bluetooth® technology. However, it should be interpreted to be demonstrative, not restrictive.

The present invention describes an apparatus and method for determining a hopping sequence for selecting a channel from M channels divided into Np partitions to reduce probability of data collision in a FHSS communication system. The apparatus selects a partition sequence based on data collision ratios respectively corresponding to Np partitions, traffic requirements, traffic characteristic, or certain communication regulations over band utilization, and the maps an original hopping sequence to the partition sequence selected and selects an appropriate hopping sequence.

According to the three non-overlapped direct sequence spread spectrum (DSSS) channel numbers of IEEE 802.11 (b) in North America, the channels of IEEE 802.11(b) can be divided into three distinctive partitions, as shown in the table right below.

| DSS Channel | Central frequency (MHz) | Range (MHz) | Corresponding Bluetooth® channel number |
|---|---|---|---|
| 1 | 2412 | 2400–2424 | 0–22 |
| 6 | 2437 | 2425–2449 | 23–47 |
| 11 | 2642 | 2450–2474 | 48–72 |

In similar manner, the 79 Bluetooth® hopping channels are divided into 3 partitions. The excess channel numbers from 73 to 79 is distributed as even as possible into the three partitions to achieve full utilization. One exemplary way for distributing them is shown in the table below. The division of three partitions is only for demonstration purpose. Any division of more than one partition is applicable to FHSS communication systems, including IEEE802.11(b) devices and Bluetooth® devices. Different logic of division is also possible for the present invention.

| Partition number | Corresponding Bluetooth® channel number | Total channels in this partition | Corresponding DSSS Channel number |
|---|---|---|---|
| 1 | 0–22, 75–77 | 26 | 1 |
| 2 | 23–47, 78 | 26 | 6 |
| 3 | 48–72, 73–74 | 27 | 11 |

For example, a data collision occurs when a Bluetooth® device and an adjacent 802.11(b) device transmit signals with both time slot and frequency overlapping. Based on the intuitive knowledge that a channel from one partition will surely be different to a channel from another non-overlapping partition, it is more convenient to design the hopping sequence for co-existence. This implies a two-level hopping sequence structure. A set of predetermined partition sequences is first designed. Once a partition sequence is selected, the original hopping sequence is mapped to the partition sequence and a new hopping sequence is thus obtained.

In accordance with the FCC restriction, two different cases, uniform and non-uniform channel usage, should be considered. If non-uniform channel usage is allowed, the partition sequence can simply consist of partitions not coinciding with the partitions employed by the IEEE 802.11 (b) devices. If the channel has to be used evenly, so have the partitions. In the exemplary case of three partitions, a partition will have to occupy one third of time, on average. With a proper arrangement, we can transfer up to two thirds of the maximum capacity without using a specific partition. An example is given below with reference to the Table below.

Consider a partition sequence {P1 P2 P3 P1 P2 P3} in a Bluetooth® device. The unit of time is equal to two slot periods of Bluetooth® (i.e. 950 microseconds). A slave slot takes the same partition as the preceding master slot Two types of full-duplex Synchronous Connection Oriented (SCO) traffic are considered. One is with Tsco=4 that utilizes ½ of channel capacity, and the other is with Tsco=6 that utilizes ⅓ of channel capacity. It is easily seen that SCO type of traffic can be transferred without using some specific partitions As an example, if some IEEE 802.11(b) devices are using the channels overlapped with partition 2, a SCO type of traffic with Tsco=4 can be transferred with offset=0 and thus can avoid to use channels within partition 2. This as well as other 4 examples are illustrated in the table below.

| Time % 6 | 0 | 1 | 2 | 3 | 4 | 5 | P1 usage | P2 usage | P3 usage |
|---|---|---|---|---|---|---|---|---|---|
| Partition | P1 | P2 | P3 | P1 | P3 | P2 | | | |
| Tsco/2 = 2 Offset = 0 | X | | X | | X | | 1 | 0 | 2 |
| Tsco/2 = 2 Offset = 1 | | X | | X | | X | 1 | 2 | 0 |
| Tsco/2 = 3 Offset = 0 | X | | | X | | | 2 | 0 | 0 |
| Tsco/2 = 2 Offset = 1 | | X | | X | | | 0 | 1 | 1 |
| Tsco/2 = 3 Offset = 2 | | | X | | X | | 0 | 1 | 1 |

Following very same idea a number of partition sequences can be determined and is stored in the host apparatus in communication system according to the invention In the present invention, an additional hopping sequence generator compatible with a conventional sequence generator is provided.

As shown in FIG. 1, a host apparatus 100 of the present invention for determining a hopping sequence from M channels divided into Np partitions to reduce probability of data collision in frequency hopping spread spectrum (FHSS) communication system. The host apparatus stores Q partition sequences in a first selector 103 and receives a first sequence of M channels. M, Np and Q are positive integers. The first sequence is generated by a conventional sequence generator 105.

The host apparatus includes a measurement circuit 102 for measuring Np data collision ratios respectively corresponding to Np partitions, responsive to a RF signal 111, the Np data collision ratios having value of R(i), i being from 1 through Np and denoting an ith partition; a first selector 103 for selecting a partition sequence from Q partition sequences, the partition sequence having a smallest value of a selection function H(p), wherein the selection function is a summation of R(i)* relative frequency of occurrence of the ith partition in each of Q partition sequences, p being from 1 through Q and denoting pth partition sequence; a mapping circuit 104 for mapping the first sequence of M channels to the selected partition sequence to produce a second sequence of M channels; and a second selector 106, responsive to a control signal, for selecting one of the first sequence and the second sequence as the hopping sequence.

A RF signal 111 is first received by a channel selector 101. The RF signal 111 then is down converted to an IF signal 112. The IF signal 112 converted from the RF signal 111 is then passed to a measurement circuit 102. The measurement circuit measures Np data collision ratios respectively corresponding to Np partitions. Np data collision ratios have values of R(i), i being from 1 through Np and denoting an ith partition. A first selector 103 receives Np data collision ratios 113 and selects a partition sequence from Q partition sequences with the smallest value of a selection function H(p) for each of Q partition sequences. The selection function H(p) refers to the summation of R(i)* relative frequency of occurrence of the Ith partition in each of Q partition sequences. The p is from 1 through Q and denotes pth partition sequence.

One of the preferred embodiments of the algorithms utilized for selecting a partition sequence with the smallest H(p) is described below. R(i) is the data collision ratio of partition i. V is a vector of the partition numbers sorted according to data collision ratios, from the smallest to the largest ratio. I is the number of R(i)s exceeding a threshold R0; for example, if R(1)=0.9, R(2)=0.05, R(3)=0.4 and R0.times.0.1; then I=2; since R(2)<=R(3)<=R(1), V=(v1,v2,v3)=(2,3,1). N is number of partitions. Uk(p) is the partition usage vector. Uk(p) denotes the kth element of the partition usage vector. Given the reserved slots by traffic requirement, the pth partition sequence will use kth partition Uk(p) times in the reserved time slots during a period of a partition sequence. For example, if the 7$^{th}$ partition sequence "1 2 3 1 3 2", and if the traffic requirement reserved the second and the fifth element, then "2" is used for one time and "3" is used for one time, "1" is not used. Thus, the usage vector U(7)=(0,1,1), u1(7)=0, u2(7)=1, u3(7)=1 are obtained. (1) First, the partitions with interference data collision ratios below the threshold are regarded as no interference, and the corresponding data collision ratios are set to zero. (2) From the time slots reserved by the traffic requirements and traffic characteristic, calculate the partition usage vector U for partition sequence, where the kth element of U, $u_k$, is proportioned to the relative occurrence of partition k in the reserved time slots. (3) Calculate a selection function H(p) for each sequence $$H(p) = \sum_{k=1}^{N_P} R(k) \cdot u_k(p)$$

where p denotes the pth partition sequence (4) With H(p) for each of the partition sequences, select the one with minimal H(p). If more than one sequences are obtained in (4), select the partition sequence that most evenly uses the partitions. This is done by selecting the partition sequence of type q that satisfies the following equation.

$$q = \arg\min_{p} \max_{k} u_k(p)$$

Another preferred embodiment of the algorithms utilized for selecting a partition sequence with the smallest H(p) is described below. The second algorithm uses the information of data collision ratios indirectly by their sorted order. (1) First, from the time slots reserved by the traffic requirement, calculate the partition usage vector U for partition sequence, where the kth element of U, $u_k$, is proportioned to the relative occurrence of partition k in the reserved time slots. (2) In this step, we look for a partition sequence that does not use the x most interfered partitions in the reserved time slots. Let x=I, and find a partition sequence such that $$u_{v(j)}(p)=0 \ \forall j=Np\sim(Np-x+1)$$

where P denotes the pth partition sequence (3) If no such sequence can be found in (2), we lower the selection criteria by decreasing the number x. For those used partitions, the sequence should more frequently use the partition with less data collision ratio.

Let x=x−1, and find a partition sequence such that $$u_{v(j)}(p)=0 \ \forall j=Np\sim(Np-x+1) \text{ and}$$

$$u_{v(j-1)}(p) \geq u_{v(j)}(p) \forall j=(Np-x)\sim(Np-I+1).$$

(4) If no such sequence can be found a (3), repeat (3) with the value x decreased by one while x is larger than zero. (5) If more than one sequences are obtained from (2) (3) (4), select the sequence that most evenly uses the partitions. This is done by select the sequence of type q that $$q = \arg\min_{p} \max_{k} u_k(p).$$

(6) If no sequence can be obtained from (2) (3) (4), select the original sequence.

The first selector 103 then delivers the selected partition sequence 115 to a mapping circuit 104. The first selector 103 also sends a control signal 114 to a second selector 106. The mapping circuit 104 receives the first sequence 117 generated by a conventional sequence generator 105 and maps the first sequence 117 into the selected partition sequence 115 to produce a second sequence of M channels. With a control signal 114 from the first selector 103, the second selector 106 selects one of the first sequence 117 and the second sequence 116 to obtain the hopping sequence 118.

Figure 2:
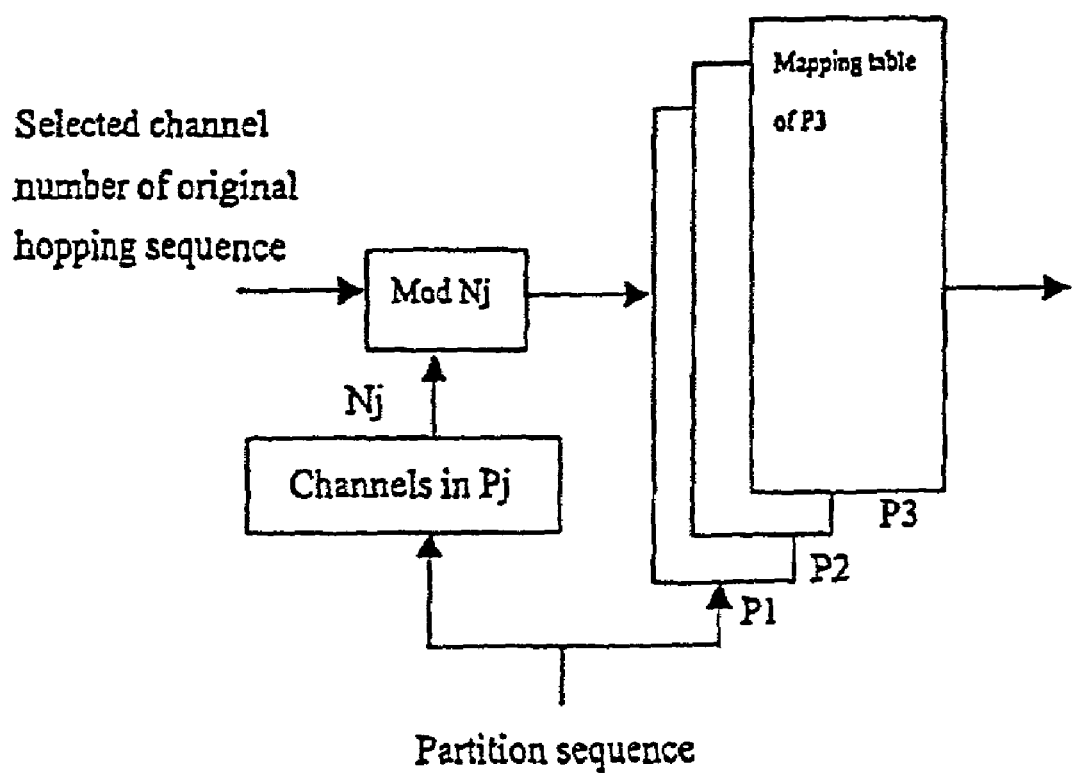
FIG. 2 illustrates a preferred way for mapping a sequence into a partition sequence.

A preferred embodiment of the mapping circuit is provided. Refer now to FIG. 2. FIG. 2 is an illustration of how mapping is carried out. In an exemplary case, the spread spectrum band is divided into three distinctive partitions. They are partition 1 (P1), partition 2 (P2) and partition 3 (P3) respectively. Channels in one of the partitions form the mapping table of the partition. A selected partition sequence is first fed into the mapping circuit. A mapping table in accordance with a partition occurring in the partition sequence is selected. At the same time, the number of channels Nj in partition j (Pj) is derived, j being from 1 through 3 and denoting the jth partition. The residue of the number of the first sequence over Nj is obtained and mapped into the selected mapping table. In other words, the mapping process translate an input channel number A in the first hopping sequence to an output channel number B within the corresponding partition in the partition sequence in a predetermined manner.

Figure 3:
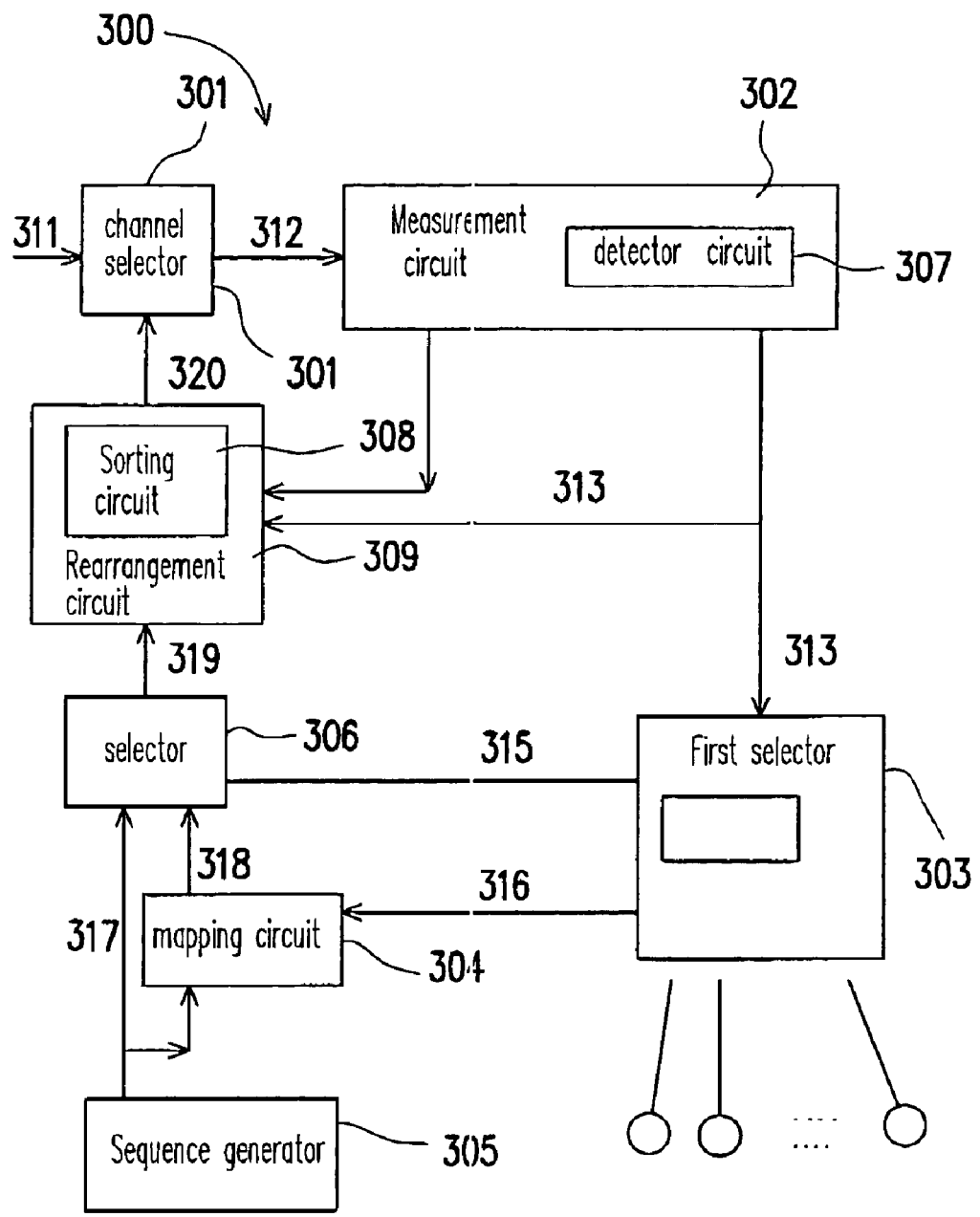
FIG. 3 illustrates a block diagram of a host apparatus in accordance with another embodiment of the present invention.

In another embodiment of the present invention, as shown in FIG. 3, a host apparatus 300 of the invention for determining a hopping sequence from M channels divided into Np partitions to reduce probability of data collision in frequency hopping spread spectrum (FHSS) communication system The host apparatus stores Q partition sequences in a first selector 303 and receives a first sequence of M channels. M, Np and Q are positive integers. The first sequence is generated by a conventional sequence generator 305. The apparatus 300 includes a detector circuit 307, responsive to a RF signal 311, for detecting an interference event within the RF signal a measurement circuit 302 for measuring Np data collision ratios respectively corresponding to Np partitions, responsive to the RF signal, the Np data collision ratios having value of R(i), i being from 1 through Np and denoting an ith partition; a first selector 303 for selecting a partition sequence from Q partition sequences, the partition sequence having a smallest value of a selection function H(p), wherein the selection function is a summation of R(i)* relative frequency of occurrence of the ith partition in each of Q partition sequences, p being from 1 through Q and denoting pth partition sequence; a mapping circuit 304 for mapping the first sequence of M channels to the selected partition sequence to produce a second sequence 318 of M channels; a second selector 306, responsive to a control signal 315, for selecting one of the first sequence 317 and the second sequence 318 to obtain a third sequence 319; a sorting circuit 308 for sorting R(i) of Np data collision ratios from the highest to the lowest to obtain T most interfered partitions, wherein the T is a predetermined value; and a rearrangement circuit 309 for rearranging the third sequence 319 to obtain the hopping sequence in a predetermined manner, as an interference event is detected by the detector circuit and the detected interference event occurs is within T most interfered partitions.

A RF signal 311 is first received by a channel selector 301. The RF signal 311 then is down converted to an IF signal 312. The IF signal 312 converted from the RF signal 311 is then passed to a measurement circuit 302. The measurement circuit 302 measures Np data collision ratios respectively corresponding to Np partitions. Np data collision ratios have values of R(i), i being from 1 through Np and denoting an ith partition. A detector circuit 307 in the measurement circuit detects an interference event and informs a rearrangement circuit 309 of the interference event 314. A first selector 303 receives Np data collision ratios 313 and selects a partition sequence from Q partition sequences with the smallest value of a selection function H(p) for each of Q partition sequences. The selection function H(p) refers to the summation of R(i)* relative frequency of occurrence of the Ith partition in each of Q partition sequences, p is from 1 through Q and denotes pth partition sequence.

The preferred embodiments of algorithms utilized for selecting a partition sequence with the smallest H(p) are described as those mentioned in the description of the host apparatus 100.

The first selector 303 then delivers the selected partition sequence 316 to a mapping circuit 304. The first selector 303 also sends a control signal 315 to a second selector 306. The mapping circuit 304 receives the first sequence 317 generated by a conventional sequence generator 305 and maps the first sequence 318 into the selected partition sequence 316 to produce a second sequence 318 of M channels. A preferred embodiment of the mapping circuit is given in the description of the host apparatus 100. With the control signal 315 from the first selector 303, the second selector 306 selects one of the first sequence 317 and the second sequence 318 to obtain a third sequence 319. The rearrangement circuit receives the data collision ratio 313, the third sequence 319 and an interference event 314 informed by a detector circuit 307. A sorting circuit 308 implemented in the rearrangement circuit 309 sorts R (i) of N data collision ratios from the highest to the lowest to obtain T most interfered partitions, wherein T is a predetermined value. The rearrangement circuit 309 rearranges the third sequence 319 to obtain the hopping sequence 320 in a predetermined manner, as an interference event is detected by the detector circuit 307 and the detected interference event occurring is within T most interfered partitions.

One of the preferred predetermined manners as aforementioned about the rearrangement circuit 309 refers to moving channels in the third sequence, corresponding to a partition within which the interference event is detected, toward end of the third sequence. Example of rearrangement is as follows. Given that partition 1 includes channel 1 to channel 3, partition 2 includes channel 4 to channel 6 and Partition 3 includes channel 7 to channel 9. For a third sequence, 2 5 4 7 9 8 3 1 6 if an interference is detected and the detected interference is in T most interfered partitions, P=1 and P1 is the most interfered partition, then the channels in partition 1 (i.e. channel 1 to 3) will be moved toward end of the third sequence. That is 5 4 7 9 8 6 2 3 1

Figure 4:
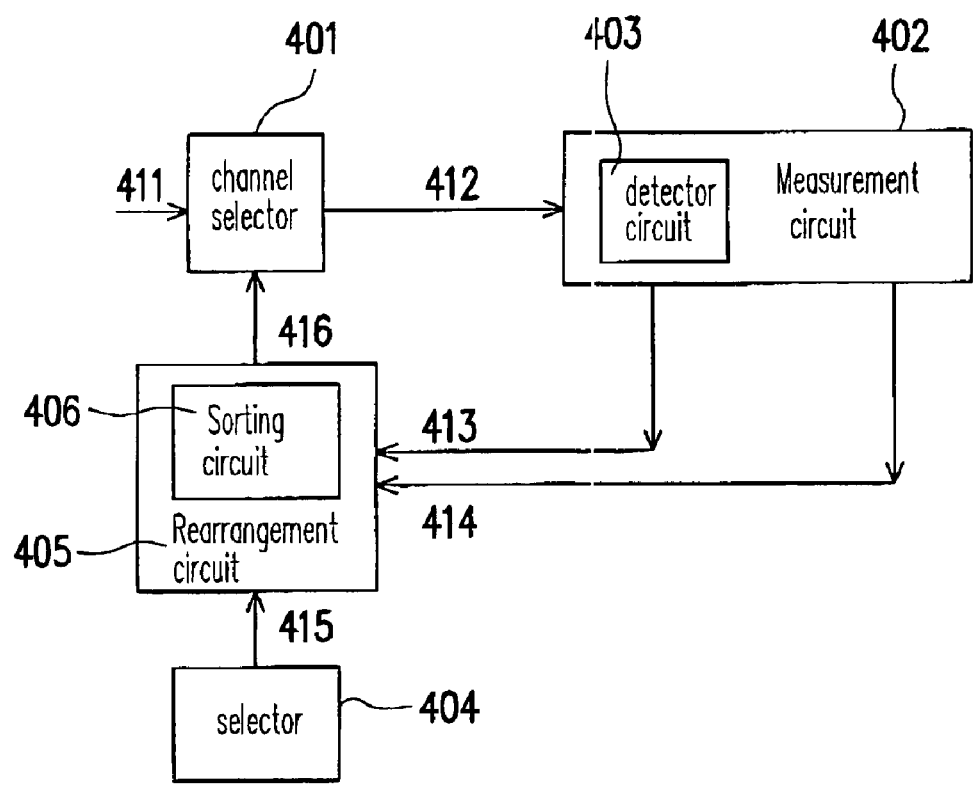
FIG. 4 illustrates a block diagram of a host apparatus in accordance with still an embodiment of the present invention.

In still another embodiment of the present invention, as shown in FIG. 4, an apparatus 400 determining a hopping sequence for selecting a channel from M channels divided into Np partitions to reduce probability of data collision in FHSS communication system is provided. The apparatus receives a sequence of M channels. The first sequence is generated by a conventional sequence generator. M, Np and Q are positive integers. The apparatus 400 includes a detector circuit 403, responsive to a RF signal 411, for detecting an interference event within the R signal; a measurement circuit 402 for measuring Np data collision ratios respectively corresponding to Np partitions, responsive to the RF signal, the Np data collision ratios having value of R(i), i being from 1 through Np and denoting an ith partition; a sorting circuit 406 for sorting R(i) of Np data collision ratios from the highest to the lowest to obtain T most interfered partitions, wherein the T is a predetermined value; and a rearrangement circuit 405 for rearranging the sequence to obtain the hopping sequence 416 in a predetermined manner, as an interference event is detected by the detector circuit and the detected interference event occurs is within T most interfered partitions.

A RF signal 411 is first received by a channel selector 401. The RF signal 411 then is down converted to an IF signal 412. The IF signal 412 converted from the RF signal 411 is then passed to a measurement circuit 402. The measurement circuit 402 measures Np data collision ratios respectively corresponding to Np partitions. Np data collision ratios have values of R(i), i being from 1 through Np and denoting an ith partition. A detector circuit 403 in the measurement circuit detects an interference event and informs a rearrangement circuit 405 of the interference event 413. A conventional sequence generator 404 generates the sequence 415 and sends it to the rearrangement circuit 405. A sorting circuit 406 implemented in the rearrangement circuit 405 sorts R (i) of N data collision ratios from the highest to the lowest to obtain T most interfered partitions, wherein T is a predetermined value.

The rearrangement circuit 405 rearranges the sequence 415 generated by the conventional sequence generator 404 to obtain the hopping sequence 416 in a predetermined manner, as an interference event is detected by the detector circuit 403 and the detected interference event occurs is within T most interfered partitions. The preferred predetermined manner is the same as that given in the description about the predetermined manner for the rearrangement circuit 309.

Figure 5:
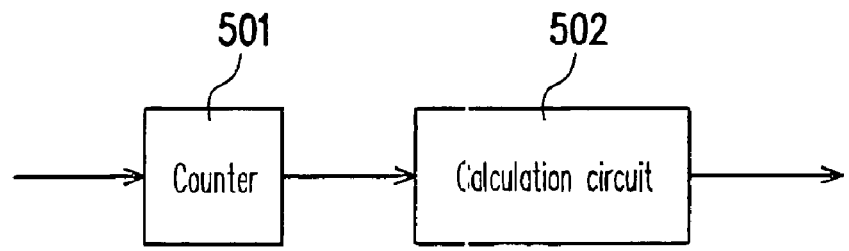
FIG. 5 illustrates the detailed structure of a measurement circuit in accordance with an embodiment of the present invention.

See FIG. 5, the measurement circuits 102, 302 and 402 each can further includes a counter 501 for counting number of interference events E and number of interference-free events En corresponding to each of Np partitions and a calculation circuit 502 for calculating the data collision ratio for each of Np partitions as the ratio of En over En+E.

Figure 6:
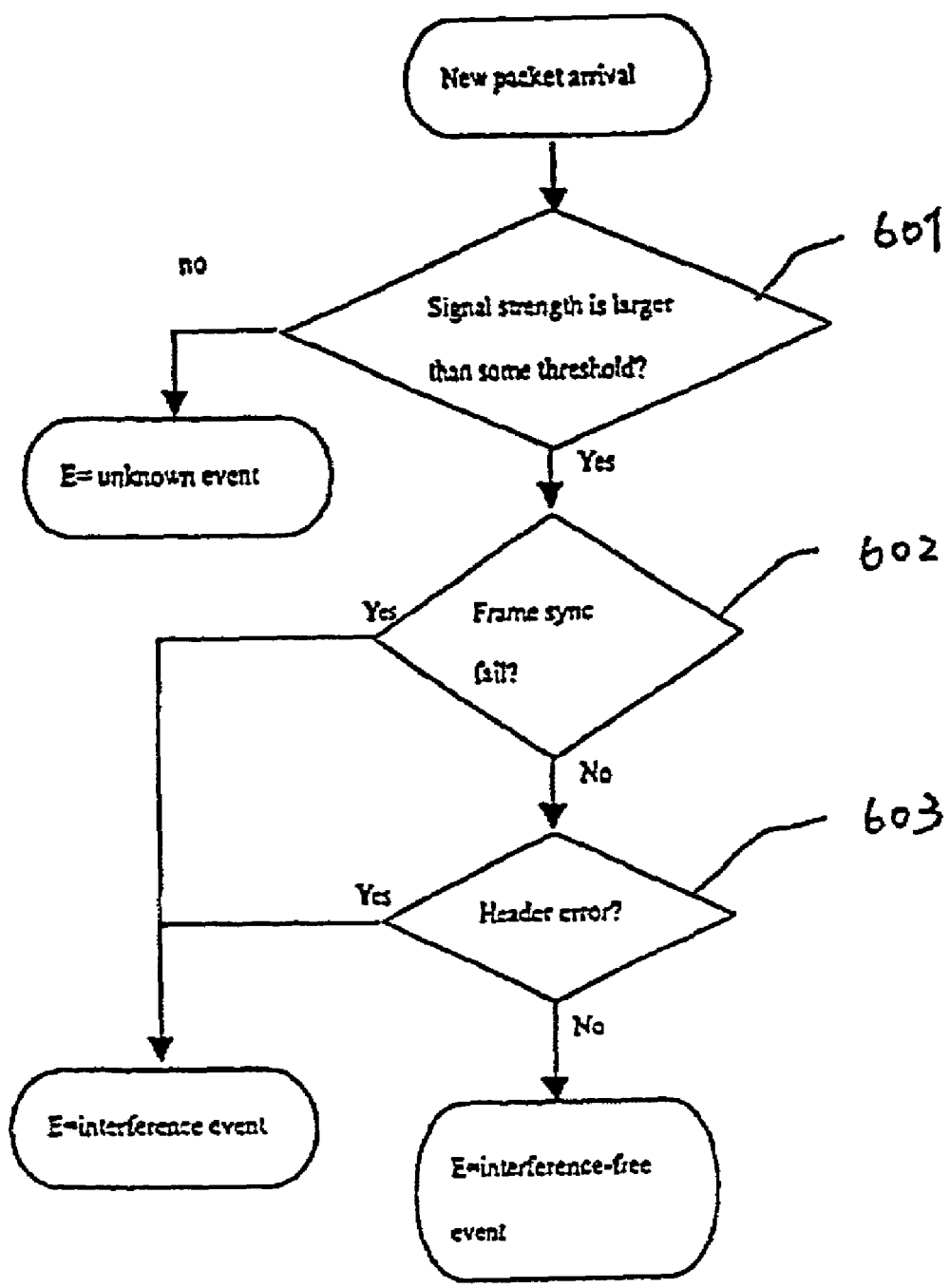
FIG. 6 illustrates a block diagram showing how an interference event or an interference free event is determined.

FIG. 6 shows a block diagram illustrating how an interference event or an interference free event is determined. In operation 601, whether the signal strength of an input RF signal is greater than a predetermined threshold. If no, there is an unknown event. If yes, the process goes on to operation 602. In operation 602, whether frame synchronization fails is determined. If yes, there is an interference event If no, then it goes to operation 603. In operation 603, whether there is any header error present is determined. If yes, there is an interference event. If no, there is an interference free event.

In addition, any of the partition sequences selected by a first selector as aforementioned above in host apparatus 100 or apparatus 300 meets a regulation over band utilization in frequency hopping spread spectrum communication system. Examples of these regulations are the restrictions established by FCC as aforementioned and certain rules set forth by groups of interest Moreover, the partition sequences are such selected that they meet Arc requirements or traffic characteristic in FHSS communication systems. The traffic characteristics, for example, include traffic patterns of a synchronous type and an asynchronous type. Examples of a synchronous type of traffic are voices and video, where the service or information is time-bounded and real-time. Examples of an asynchronous type of traffic are short message, email and FTP, where what matters most is the overall throughput of right information. Delay is not endurable in the synchronous type of information. Usually reserved time slots for the synchronous type of traffic are required to ensure smooth receiving. Other traffic requirements and characteristic are also possible.

The hopping sequence as a result of a rearrangement circuit as mentioned in the description about the host apparatus 300 and the apparatus 400 meets a regulation over band utilization in frequency hopping spread spectrum communication system. Examples of these regulations are the restrictions established by FCC as aforementioned and certain rules set forth by groups of interests Moreover, the sequence from the second selector or the sequence generated by the conventional sequence generator are such selected that they meet traffic requirements or traffic characteristic in FHSS communication systems The traffic characteristics, for example, include traffic patterns of a synchronous type and an asynchronous type. Examples of a synchronous type of traffic are voices and video, where the service or information is time-bounded and real-time. Examples of an asynchronous type of traffic are short message, email and FTP, where what matters most is the overall throughput of right information. Delay is not endurable in the synchronous type of information. Usually reserved time slots for the synchronous type of traffic are required to ensure smooth receiving. Other traffic requirements and characteristic are also possible.

Figure 7:
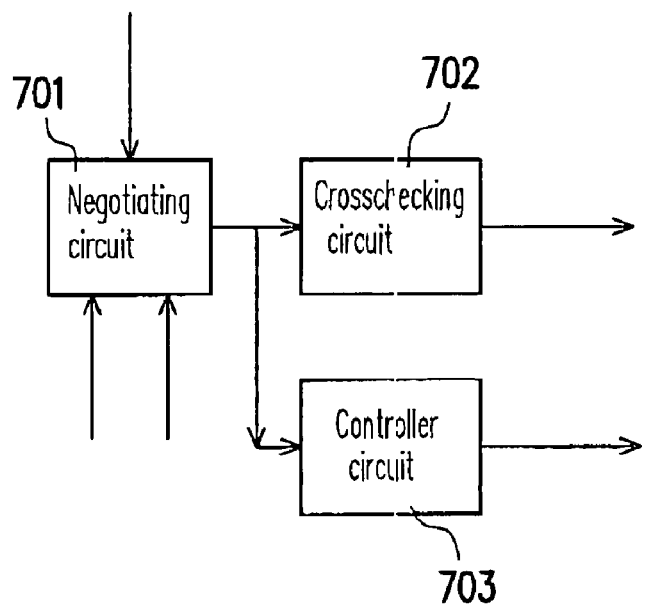
FIG. 7 illustrates a detailed structures of a host apparatus or an apparatus in accordance with an embodiment of the present invention.

See FIG. 7. Each of the host apparatus 100 and the apparatus 300 can further includes a negotiating circuit 701 for negotiating with one of multiple peer devices to determine whether the peer device supports the Q partition sequences, a crosschecking circuit 702 for selectively crosschecking with other peer devices to determine whether other peer devices support tile selected partition sequence and a controller circuit 703, responsive to the results of negotiation, by the negotiation circuit and the crosscheck by the crosschecking circuit, for generating the control signal. If the peer device of possible transmission and receipt support Q predetermined partition sequences, the controller circuit 703 in the first selector_103 or 303 will generate a control signal 114 or 315 and sent the signal to the second selector 106 or 306. If not, the controller circuit 703 will not generate a control signal. If more than one peer devices exist, the crosschecking circuit 702 will crosscheck with other peer devices to determine whether they support Q predetermined partition sequences. The second selector 106 or 306 will select the second sequence upon receiving the control signal. Otherwise, the second selector 106 or 306 will select the second sequence. An option is that the controller circuit 703 can generate two kinds of control signals other the one-or-none control strategy.

The results of negotiations by the negotiation circuit 701 and crosschecks by the crosschecking circuit 702 can be maintained in a directory to record peer devices supporting Q partition sequences and the hopping sequence currently selected for communicating with a peer device. An example of information recorded in the directory is given below.

| | 3 | |
|---|---|---|
| Selected partition sequence Peer address | Capability to support the mapped sequence? | Current sequence used |
| 1 | Yes | Mapped |
| 3 | No | Original |
| 4 | Yes | Mapped |
| 7 | Yes | Original |

The multiple peer devices include a first type of peer device external to the apparatus and a second type of peer device integral with the apparatus, such as the host apparatus 100 and the apparatus 300.

As shown in a flow diagram of a preferred arrangement in FIG. 8, a method 800 for determining a hopping sequence for selecting a channel from M channels divided into Np partitions to reduce probability of data collision in frequency hopping spread spectrum (FHSS) communication system is provided The FHSS communication system has a host apparatus. The host apparatus stores Q partition sequences and receives a first sequence of M channels. M, Np and Q are positive integers. The method includes the steps of (801) measuring Np data collision ratios respectively corresponding to Np partitions, responsive to a RF signal, the Np data collision ratios having value of R(i), i being from 1 through Np and denoting an ith partition; (802) selecting a partition sequence from Q partition sequences, the partition sequence having a smallest value of a selection function H(p), wherein the selection function is a summation of R(i)* relative frequency of occurrence of the ith partition in each of Q partition sequences, p being from 1 through Q and denoting pth partition sequence; (803) mapping the first sequence of M channels to the selected partition sequence to produce a second sequence of M channels; and (804) responsive to a control signal, selecting one of the first sequence and the second sequence as the hopping sequence.

Figure 9:
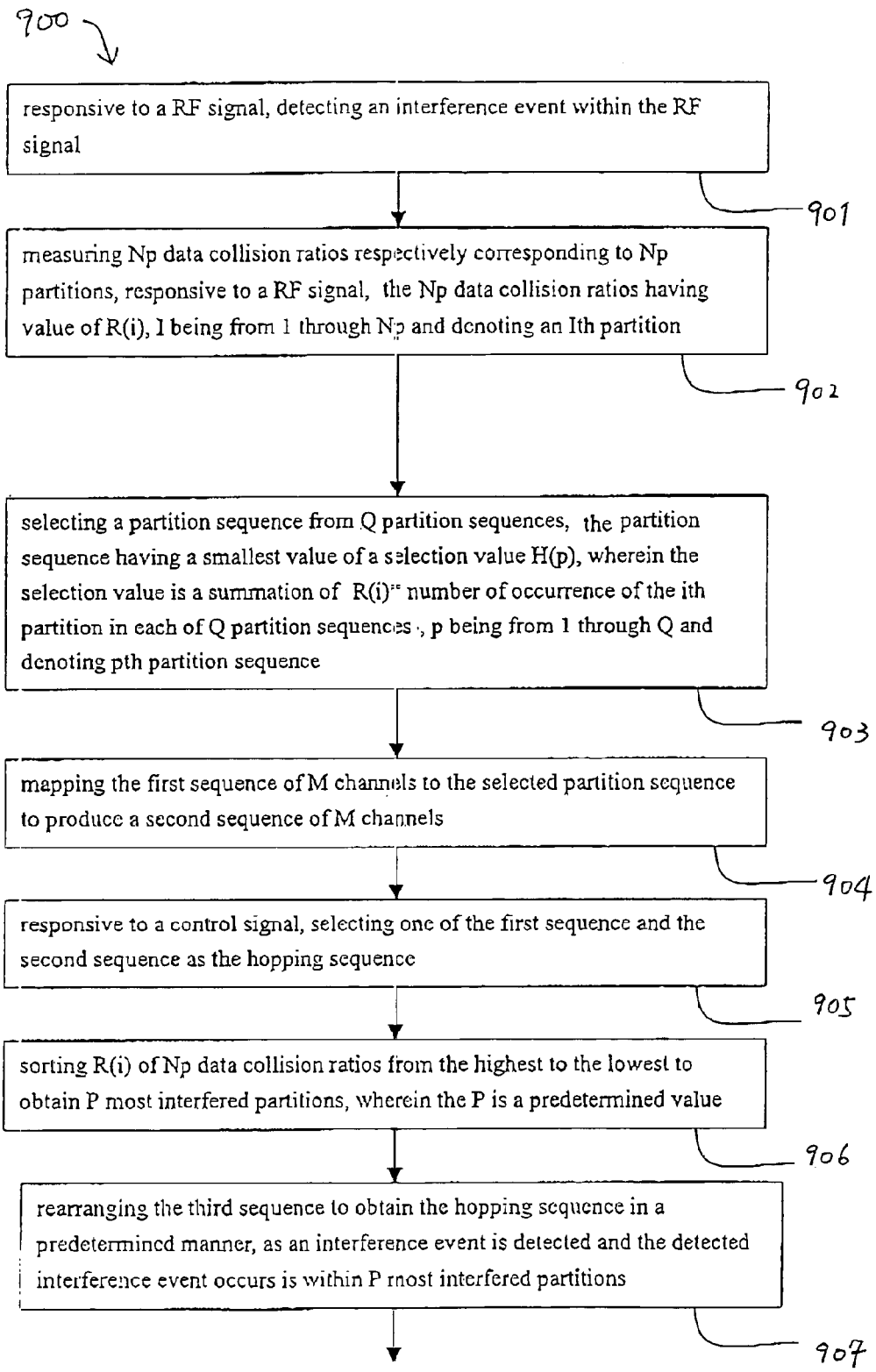
FIG. 9 illustrates a flow diagram of method 900 in accordance with another embodiment of the present invention.

In another preferred arrangement of the present invention, as shown in a flow diagram of FIG. 9, a method 900 for determining a hopping sequence for selecting a channel from M channels divided into Np partitions to reduce probability of data collision in frequency hopping spread spectrum (FHSS) communication system is provided. The FHSS communication system has a host apparatus. The host apparatus stores Q partition sequences and receives a first sequence of M channels. M, Np and Q are positive integers. The method includes the steps of: (901) responsive to a RF signal, detecting an interference event within the RF signal; (902) measuring Np data collision ratios respectively corresponding to Np partitions, responsive to the RF signal, the Np data collision ratios having value of R(i), i being from 1 through Np and denoting an ith partition; (903) selecting a partition sequence from Q partition sequences, the partition sequence having a smallest value of a selection function H(p), wherein the selection function is a summation of R(i)* relative frequency of occurrence of the ith partition each of Q partition sequences, p being from 1 through Q and denoting pth partition sequence; (904) mapping the first sequence of M channels to the selected partition sequence to produce a second sequence of M channels; (905) responsive to a control signal, selecting one of the first sequence and the second sequence to obtain a third sequence; (906) sorting R(i) of Np data collision ratios from the highest to the lowest to obtain T most interfered partitions, wherein the T is a predetermined value; and (907) rearranging the third sequence to obtain the hopping sequence in a predetermined manner, as an interference event is detected in step 901 and the detected interference event occurs is within T most interfered partitions.

Figure 10:
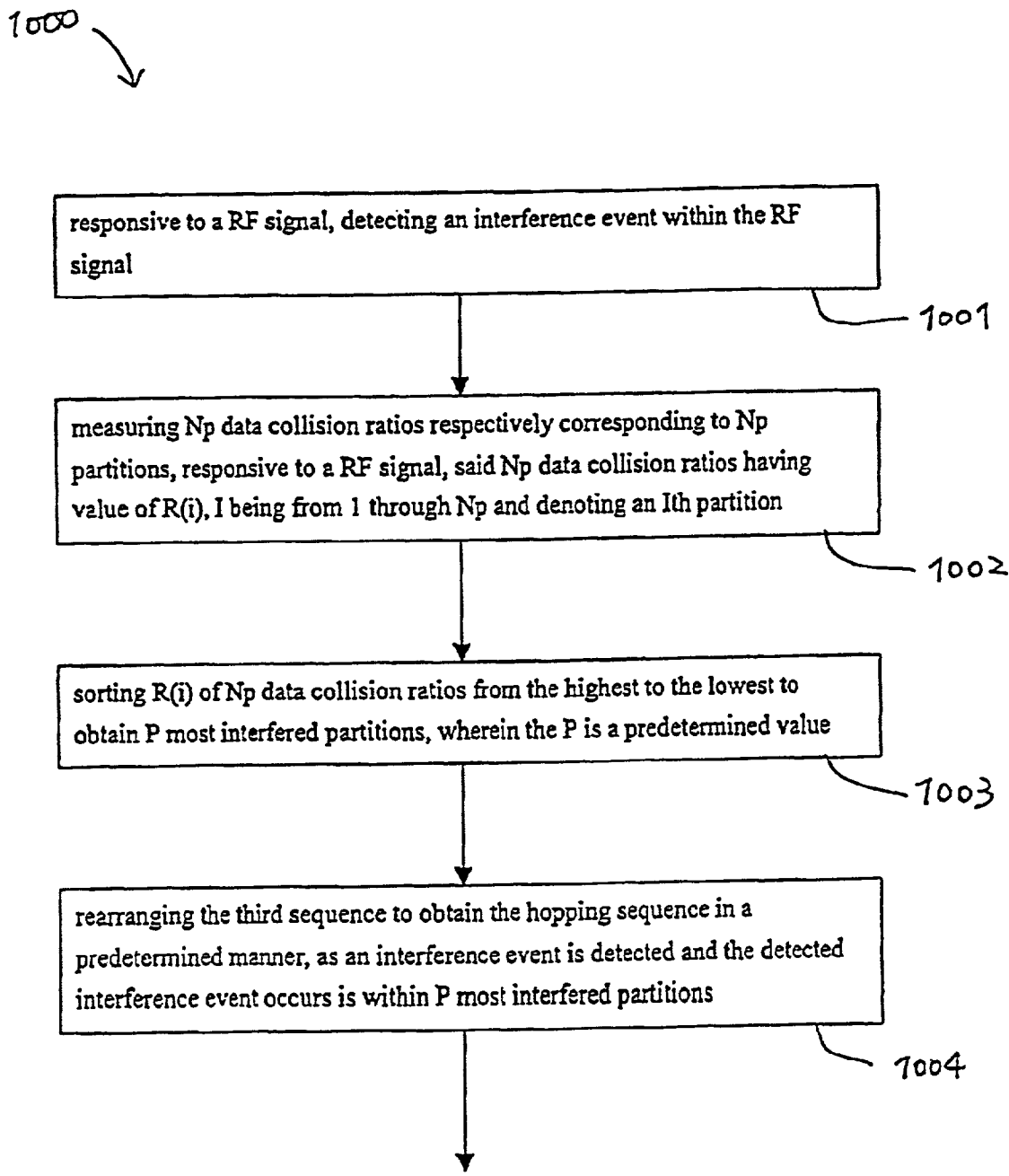
FIG. 10 illustrates a flow diagram of method 1000 in accordance with still another embodiment of the present invention.

In still another preferred arrangement of the present invention, as shown in a flow diagram of FIG. 10, a method 1000 for determining a hopping sequence for selecting a channel from M channels divided into Np partitions to reduce probability of data collision in frequency hopping spread spectrum (FHSS) communication system is provided. The FHSS communication system has a host apparatus. The host apparatus receives a first sequence of M channels. M, Np and Q are positive integers. The method includes the steps of: (1001) responsive to RF signal, detecting an interference event within the RF signal; (1002) measuring Np data collision ratios respectively corresponding to Np partitions, responsive to the RF signal, the Np data collision ratios having value of R(i), i being from 1 through Np and denoting an ith partition; (1003) sorting R(i) of Np data collision ratios from the highest to the lowest to obtain T most interfered partitions, wherein the T is a predetermined value; and (1004) rearranging the sequence to obtain the hopping sequence in a predetermined manner, as an interference event is detected in step (1001) and the detected interference event occurs is within T most interfered partitions.

Figure 11:
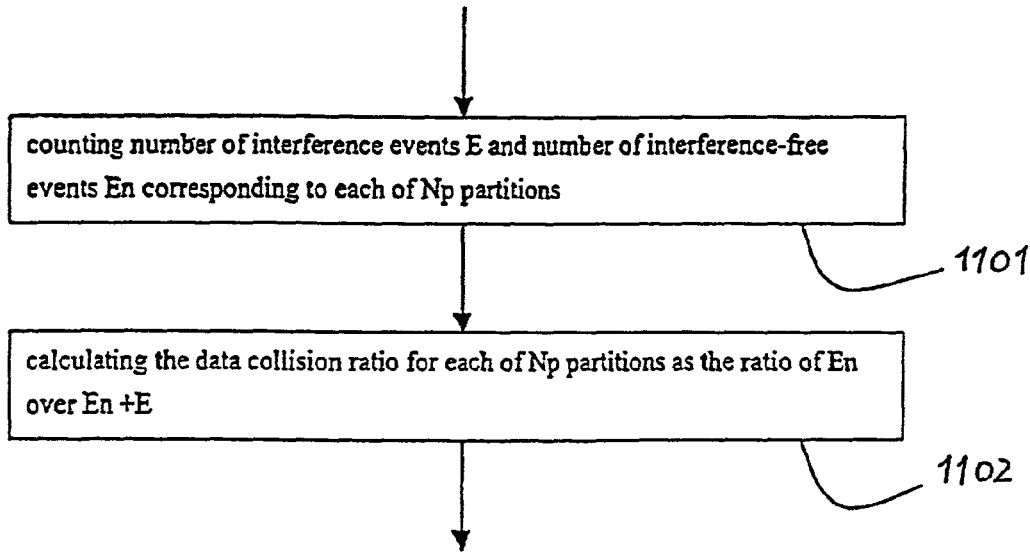
FIG. 11 illustrates detailed schemes of the step 801, 902 and 1002.
Figure 12:
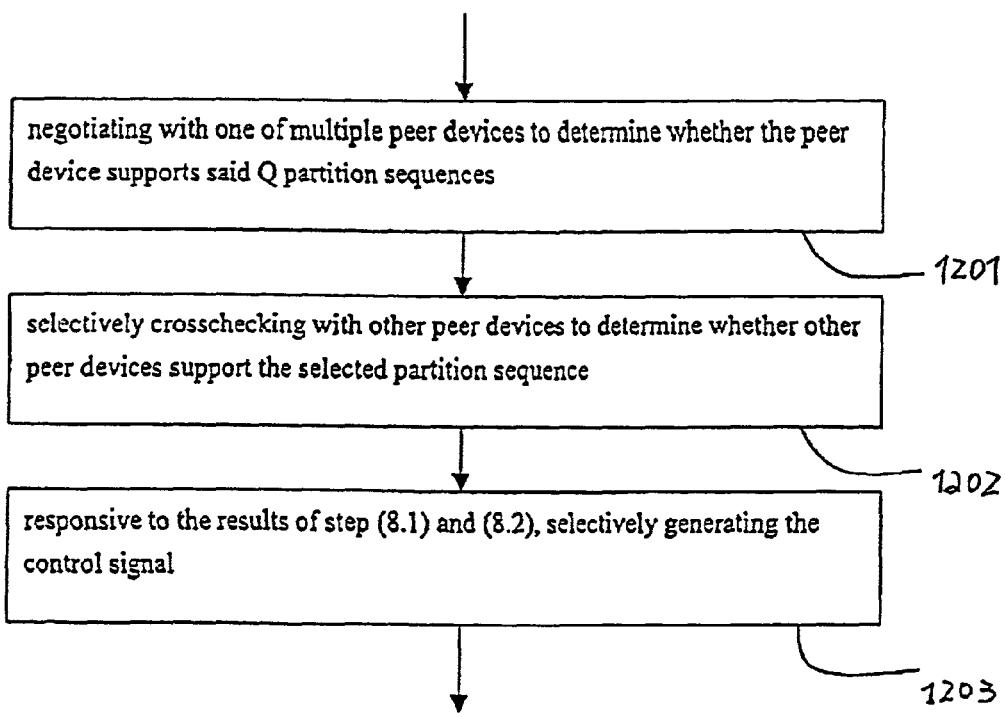
FIG. 12 illustrates detailed schemes of method 800 and 1000.

Steps 801, 902 and 1002 further consist of step 1101 and 1102 as shown in FIG. 11. In step 1101, the number of interference events E and interference events En corresponding to each of Np partitions are counted. In step 1102, data collision ratio for each of Np partitions as En/(E+En) is calculated In addition, any of the partition sequences selected selector as aforementioned above in method 900 and 1000 meets a regulation over band utilization in frequency hopping spread spectrum communication system. Examples of these regulations are the restrictions established by FCC as aforementioned and certain rules set forth by groups of interest Moreover, the partition sequences are such selected that they meet traffic requirements or traffic characteristic in FHSS communication systems. The traffic characteristics, for example, include traffic patterns of a synchronous type and an asynchronous type. Examples of a synchronous type of traffic are voices and video, where the service or information is time-bounded and real-time. Examples of an asynchronous type of traffic are short message, email and FTP, where what matters most is the overall throughput of right information. Delay is not endurable in the synchronous type of information. Usually reserved time slots for the synchronous type of traffic are required to ensure smooth receiving. Other traffic requirements and characteristic are also possible.

The hopping sequence as a result of step 907 and 1004 as mentioned in the description about the method 900 and the method 1000 meets a regulation over band utilization in frequency hopping spread spectrum communication system. Examples of these regulations are the restrictions established by FCC as aforementioned and certain rules set forth by groups of interest. Moreover, the sequences from the step 804 and 903 or the sequence generated by the conventional sequence generator are such selected that they meet traffic requirements or traffic characteristic in FHSS communication systems. The traffic characteristics, for example, include traffic patterns of a synchronous type and an asynchronous type. Examples of a synchronous type of traffic are voices and video, where the service or information is time-bounded and real-time. Examples of an asynchronous type of traffic are short message, email and FTP, where what matters most is the overall throughput of right information. Delay is not endurable in the synchronous type of information. Usually reserved time slots for the synchronous type of traffic are required to ensure smooth receiving. Other traffic requirements and characteristic are also possible.

See FIG. 2. Each of the method 800 and the method 1000 can firer includes the steps of: (1201) for negotiating with one of multiple peer devices to determine whether the peer device supports the Q partition sequences; (1202) selectively crosschecking with other peer devices to determine whether other peer devices support the selected partition sequence; and (1203) responsive to the results of negotiation, by the negotiation circuit and the crosscheck by the crosschecking circuit, generating the control signal.

The results of negotiations in step 1201 and crosschecks in step 1202 can be maintained in a directory to record peer devices supporting Q partition sequences and the hopping sequence currently selected for communicating with a peer device. An example of information recorded in the directly is given below.

| Selected partition sequence Peer address | Capability to support the mapped sequence? | Current sequence used |
| --- | --- | --- |
| 1 | Yes | Mapped |
| 3 | No | Original |
| 4 | Yes | Mapped |
| 7 | Yes | Original |

The multiple peer devices include a first type of peer device external to the apparatus and a second type of peer device integral with the apparatus, such as the host apparatus.

Method 800 correlates to the host apparatus 100. Method 900 correlates to the apparatus 300. Method 1000 correlates to the apparatus 400. This sort of correlation applies to their detailed structures and schemes. Algorithms and operations adopted by one of the method side and the apparatus side should be applicable to the other.

What is claimed is:

1. A method for determining a hopping sequence for selecting a channel from M channels divided into Np partitions to reduce probability of data collision in a frequency hopping spread spectrum (FHSS) communication system having a host apparatus, the host apparatus storing Q partition sequences and receiving a first sequence of M channels, M, Np and Q being positive integers, comprising the steps of:
    (a) measuring Np data collision ratios respectively corresponding to Np partitions, responsive to a RF signal, said Np data collision ratios having value of R(i), i being from 1 through Np and denoting an ith partition;
    (b) selecting a partition sequence from Q partition sequences, said partition sequence having a smallest value of a selection function H(p), wherein the selection function is a linear combination of the data collision ratio R(i), p being from 1 through Q and denoting a pth partition sequence;
    (c) mapping the first sequence of M channels to the selected partition sequence to produce a second sequence of M channels; and
    (d) responsive to a control signal, selecting one of the first sequence and the second sequence as the hopping sequence.

2. The method as depicted in claim 1, wherein the frequency hopping spread spectrum communication system includes frequency hopping spread spectrum multiple access (FHSSMA) communication systems.

3. The method as depicted in claim 1, wherein step (a) further comprises the steps of:
    (e) counting a number of interference events E and number of interference-free events En corresponding to each of Np partitions; and
    (f) calculating the data collision ratio for each of Np partitions as the ratio of En over En+E.

4. The method as depicted in claim 1, wherein step (b) is performed such that a regulation over band utilization in the frequency hopping spread spectrum communication system is met.

5. The method as depicted in claim 1, wherein step (b) is performed such that a traffic requirement or a traffic characteristic in the frequency hopping spread spectrum communication system is met.

6. The method as depicted in claim 5, wherein said traffic characteristic includes traffic pattern of a synchronous type and an asynchronous type.

7. The method as depicted in claim 5, wherein said traffic requirement includes a reserved time slot for transmitting or receiving information.

8. The method as depicted in claim 7, wherein a relative frequency of occurrence in step (b) is only counted over the reserved time slot.

9. The method as depicted in claim 1, wherein between step (b) and step (c) further comprises the steps of:
    (e) negotiating with one of multiple peer devices to determine whether the peer device supports said Q partition sequences;
    (f) selectively crosschecking with other peer devices to determine whether other peer devices support the selected partition sequence; and
    (g) responsive to results of step (e) and (f), selectively generating the control signal.

10. The method as depicted in claim 9, further comprising the step of maintaining a directory in the host apparatus to record peer devices supporting Q partition sequences and the hopping sequence currently selected for communicating with a peer device.

11. The method as depicted in claim 9, wherein the multiple peer devices include a first type of peer device external to the host apparatus and a second type of peer device integral with the host apparatus.

12. The method as depicted in claim 1, wherein the selection function H(p) in step (b) is a summation of R(i)* relative frequency of occurrence of the ith partition in each of Q partition sequences, p being from 1 through Q and denoting the pth partition sequence.

13. A method for determining a hopping sequence for selecting a channel from M channels divided into Np partitions to reduce probability of data collision in a frequency hopping spread spectrum (FHSS) communication system having a host apparatus, the host apparatus storing Q partition sequences and receiving a first sequence of M channels, M, Np and Q being positive integers, comprising the steps of:
    (a) responsive to a RF signal, detecting an interference event within the RF signal;
    (b) measuring Np data collision ratios respectively corresponding to Np partitions, responsive to the RF signal, said Np data collision ratios having value of R(i), i being from 1 through Np and denoting an ith partition;
    (c) selecting a partition sequence from Q partition sequences, said partition sequence having a smallest value of a selection function H(p), wherein the selection function is a linear combination of the data collision ratio R(i), p being from 1 through Q and denoting a pth partition sequence;
    (d) mapping the first sequence of M channels to the selected partition sequence to produce a second sequence of M channels;
    (e) responsive to a control signal, selecting one of the first sequence and the second sequence to obtain a third sequence;
    (f) sorting R(i) of Np data collision ratios from a highest to a lowest to obtain T most interfered partitions, wherein T is a predetermined value; and
    (g) rearranging the third sequence to obtain the hopping sequence in a predetermined manner, as an interference event is detected in step (a) and the detected interference event occurs is within T most interfered partitions.

14. The method as depicted in claim 13, wherein step (b) further comprises the steps of:
- (h) counting a number of interference events E and number of interference-free events En corresponding to each of Np partitions; and
- (i) calculating the data collision ratio for each of Np partitions as the ratio of En over En+E.

15. The method as depicted in claim 13, wherein step (c) is performed such that a regulation over band utilization in the frequency hopping spread spectrum communication system is met.

16. The method as depicted in claim 13, wherein step (c) is performed such that a traffic requirement or a traffic characteristic in the frequency hopping spread spectrum communication system is met.

17. The method as depicted in claim 16, wherein said traffic characteristic includes traffic pattern of a synchronous type and an asynchronous type.

18. The method as depicted in claim 16, wherein said traffic requirement includes a reserved time slot for transmitting or receiving information.

19. The method as depicted in claim 18, wherein a relative frequency of occurrence in step (c) is only counted over the reseed time slot.

20. The method as depicted in claim 13, wherein between step (c) and step (d) further comprises the steps of:
- (h) negotiating with one of multiple peer devices to determine whether the peer device supports said Q partition sequences;
- (i) selectively crosschecking with other peer devices to determine whether other devices support the selected partition sequence; and
- (j) responsive to the results in step (h) and (i), generating the control signal.

21. The method as depicted in claim 20, further comprising the step of maintaining a directory in the host apparatus to record peer devices supporting Q partition sequences and the hopping sequence currently selected for communicating with a peer device.

22. The method as depicted in claim 20, wherein the multiple peer devices include a first type of peer device external to the host apparatus and a second type of peer device integral with the host apparatus.

23. The method as depicted in claim 13, wherein the predetermined manner in step (g) includes the step of:
- moving channels in the third sequence, corresponding to a partition within which the interference event is detected, toward end of the third sequence to obtain the hopping sequence.

24. The method as depicted in claim 13, wherein step (g) is performed such that a regulation over band utilization in the frequency hopping spread spectrum communication system is met.

25. The method as depicted in claim 13, wherein step (g) is performed such that a traffic requirement or a traffic characteristic in the frequency hopping spread spectrum communication system is met.

26. The method as depicted in claim 25, wherein said traffic characteristic includes traffic pattern of a synchronous type and an asynchronous type.

27. The method as depicted in claim 25, wherein said traffic requirement includes a reserved time slot for transmitting or receiving information.

28. The method as depicted in claim 13, wherein the selection function H(p) in step (c) is a summation of R(i)* relative frequency of occurrence of the ith partition in each of Q partition sequences, p being from 1 through Q and denoting the pth partition sequence.

29. A method for determining a hopping sequence for selecting a channel from M channels divided into Np partitions to reduce probability of data collision in a frequency hopping spread spectrum (FHSS) communication system having a host apparatus, the host apparatus receiving a sequence of M channels, M and Np being positive integers, comprising the steps of: (a) responsive to a RF signal, detecting an interference event within the RF signal;
- (b) measuring Np data collision ratios respectively corresponding to Np partitions, responsive to the RF signal, said Np data collision ratios having value of R(i), i being from 1 through Np and denoting an ith partition;
- (c) sorting R(i) of Np data collision ratios from a highest to a lowest to obtain T most interfered partitions, wherein T is a predetermined value; and
- (d) rearranging the sequence to obtain the hopping sequence in a predetermined manner, as an interference event is detected in step (a) and the detected interference event occurs is within T most interfered partitions.

30. The method as depicted in claim 29, wherein step (b) further comprises the steps of:
- (e) counting a number of interference events E and number of interference-free events En corresponding to each of Np partition; and
- (f) calculating the data collision ratio for each of Np partitions as the ratio of En over En+E.

31. The method as depicted in claim 29, wherein the predetermined manner in step (d) includes the step of:
- moving channels in a third sequence, corresponding to a partition within which the interference event is detected, toward end of the third sequence to obtain the hopping sequence.

32. The method as depicted in claim 29, wherein step (d) is performed such that a regulation over band utilization in the frequency hopping spread spectrum communication system is met.

33. The method as depicted in claim 29, wherein step (d) is performed such that a traffic requirement or a traffic characteristic in the frequency hopping spread spectrum communication system is met.

34. The method as depicted in claim 33, wherein said traffic characteristic includes traffic pattern of a synchronous type and an asynchronous type.

35. The method as depicted in claim 33, wherein said traffic requirement includes a reserved time slot for transmitting or receiving information.

36. An apparatus, said apparatus determining a hopping sequence for selecting a channel from M channels divided into Np partitions to reduce probability of data collision in a frequency hopping spread spectrum (FHSS) communication system, the apparatus storing Q partition sequences and receiving a first sequence of M channels, M, Np and Q being positive integers, comprising:
- a measurement circuit for measuring Np data collision ratios respectively corresponding to Np partitions, responsive to a RF signal, said Np data collision ratios having value of R(i), i being from 1 through Np and denoting an ith partition;
- a first selector for selecting a partition sequence from Q partition sequences, said partition sequence having a smallest value of a selection function H(p), wherein the selection function is a linear combination of the data collision ratio R(i), p being from 1 through Q and denoting a pth partition sequence;

a mapping circuit for mapping the first sequence of M channels to the selected partition sequence to produce a second sequence of M channels; and a second selector, responsive to a control signal, for selecting one of the first sequence and the second sequence as the hopping sequence.

37. The apparatus as depicted in claim 36, wherein the frequency hopping spread spectrum communication system includes frequency hopping spread spectrum multiple access (FHSSMA) communication system.

38. The apparatus as depicted in claim 36, wherein the measurement circuit further comprises:

a counter for counting a number of interference events E and number of interference-free events En corresponding to each of Np partitions; and a calculation circuit for calculating the data collision ratio for each of Np partitions as the ratio of En over En+E.

39. The apparatus as depicted in claim 36, wherein the partition sequence selected by the first selector is such that meets a regulation over band utilization in the frequency hopping spread spectrum communication system.

40. The apparatus as depicted in claim 36, wherein partition sequence selected by the first selector is such that meets a traffic requirement or a traffic characteristic in the frequency hopping spread spectrum communication system.

41. The apparatus as depicted in claim 40, wherein said traffic characteristic includes traffic pattern of a synchronous type and an asynchronous type.

42. The apparatus as depicted in claim 40, wherein said traffic requirement includes a reserved time slot for transmitting or receiving information.

43. The apparatus as depicted in claim 42, wherein a relative frequency of occurrence used by the first calculation circuit is only counted over the reserved time slot.

44. The apparatus as depicted in claim 36, further comprises a negotiating circuit for negotiating with one of multiple peer devices to determine whether the peer device supports said Q partition sequences;

a crosschecking circuit for selectively crosschecking with other peer devices to determine whether other peer devices support the selected partition sequence; and a controller circuit, responsive to the results of negotiation by the negotiation circuit and the crosscheck by the crosschecking circuit, for generating the control signal.

45. The apparatus as depicted in claim 44, further comprising a directory to record peer devices supporting Q partition sequences and the hopping sequence currently selected for communicating with a peer device.

46. The apparatus as depicted in claim 44, wherein multiple peer devices include a first type of peer device external to the apparatus and a second type of peer device integral with the apparatus.

47. The apparatus as depicted in claim 36, wherein the selection function H(p) is a summation of R(i)* relative frequency of occurrence of the ith partition in each of Q partition sequences, p being from 1 through Q and denoting the pth partition sequence.

48. An apparatus, said apparatus determining a hopping sequence for selecting a channel from M channels divided into Np partitions to reduce probability of data collision in a frequency hopping spread spectrum (FHSS) communication system, the apparatus storing Q partition sequences and receiving a first sequence of M channels, M, Np and Q being positive integers, comprising:

a detector circuit, responsive to a RF signal, for detecting an interference event within the RF signal;

a measurement circuit for measuring Np data collision ratios respectively corresponding to Np partitions, responsive to the RF signal, said Np data collision ratios having value of R(i), i being from 1 through Np and denoting an ith partition;

a first selector for selecting a partition sequence from Q partition sequences, said partition sequence having a smallest value of a selection function H(p), wherein the selection function is a linear combination of the data collision ratio R(i), p being from 1 through Q and denoting a pth partition sequence;

a mapping circuit for mapping the first sequence of M channels to the selected partition sequence to produce a second sequence of M channels;

a second selector, responsive to a control signal, for selecting one of the first sequence and the second sequence to obtain a third sequence;

a sorting circuit for sorting R(i) of Np data collision ratios from a highest to a lowest to obtain T most interfered partitions, wherein T is a predetermined value; and a rearrangement circuit for rearranging the third sequence to obtain the hopping sequence in a predetermined manner, as an interference event is detected by the detector circuit and the detected interference event occurs is within T most interfered partition.

49. The apparatus as depicted in claim 48, wherein the measurement circuit further comprises:

a counter for counting a number of interference events E and number of interference-free events En corresponding to each of Np partitions; and a calculation circuit for calculating the data collision ratio for each of Np partitions as the ratio of En over En+E.

50. The apparatus as depicted in claim 48, wherein the partition sequence selected by the first selector is such that meets a regulation over band utilization in the frequency hopping spread spectrum communication system.

51. The apparatus as depicted in claim 48, wherein partition sequence selected by the first selector is such that meets a traffic requirement or a traffic characteristic in the frequency hopping spread spectrum communication system.

52. The apparatus as depicted in claim 51, wherein said traffic characteristic includes traffic pattern of a synchronous type and an asynchronous type.

53. The apparatus as depicted in claim 51, wherein said traffic requirement includes a reserved time slot for transmitting or receiving information.

54. The apparatus as depicted in claim 53, wherein a relative frequency of occurrence used by the first calculation circuit is only counted over the reserved time slot.

55. The apparatus as depicted in claim 48, further comprising:

a negotiating circuit for negotiating with one of multiple peer devices to determine whether the peer device supports said Q partition sequences;

a crosschecking circuit for selectively crosschecking with other peer devices to determine whether other devices support the selected partition sequence; and a controller circuit, responsive to the results of negotiation by the negotiation circuit and the crosscheck by the crosschecking circuit, for generating the control signal.

56. The apparatus as depicted in claim 55, further comprising a directory to record peer devices supporting Q partition sequences and the hopping sequence currently selected for communicating with a peer device.

57. The apparatus as depicted in claim 55, wherein multiple peer devices include a first type of peer device external to the apparatus and a second type of peer device integral with the apparatus.

58. The apparatus as depicted in claim 48, wherein the predetermined manner performed by the rearrangement circuit includes the step of:
    moving channels in the third sequence, corresponding to a partition within which the interference event is detected, toward end of the third sequence to obtain the hopping sequence.

59. The apparatus as depicted in claim 48, wherein the operation of the rearrangement circuit meets a regulation over band utilization in the frequency hopping spread spectrum communication system.

60. The apparatus as depicted in claim 48, wherein the operation of the rearrangement circuit meets a traffic requirement or a traffic characteristic in the frequency hopping spread spectrum communication system.

61. The apparatus as depicted in claim 60, wherein said traffic characteristic includes traffic pattern of a synchronous type and an asynchronous type.

62. The apparatus as depicted in claim 60, wherein said traffic requirement includes a reserved time slot for transmitting or receiving information.

63. The apparatus as depicted in claim 48, wherein the selection function H(p) is a summation of R(i)* relative frequency of occurrence of the ith partition in each of Q partition sequences, p being from 1 through Q and denoting the pth partition sequence.

64. An apparatus, said apparatus determining a hopping sequence for selecting a channel from M channels divided into Np partitions to reduce probability of data collision in a frequency hopping spread spectrum (FHSS) communication system, the apparatus receiving a sequence of M channels, M and Np being positive integers, comprising: a detector circuit, responsive to a RF signal, for detecting an interference event within the RF signal;
    a measurement circuit for measuring Np data collision ratios respectively corresponding to Np partitions, responsive to the RF signal, said Np data collision ratios having value of R(i), i being from 1 through Np and denoting an ith partition;
    a sorting circuit for sorting R(i) of Np data collision ratios from a highest to a lowest to obtain T most interfered partitions, wherein T is a predetermined value; and
    a rearrangement circuit for rearranging the sequence to obtain the hopping sequence in a predetermined manner, as an interference event is detected by the detector circuit and the detected interference event occurs is within T most interfered partitions.

65. The apparatus as depicted in claim 64, wherein the measurement circuit further comprises:
    a counter for counting a number of interference events E and number of interference-free events En corresponding to each of Np partitions; and
    a second calculation circuit for calculating the data collision ratio for each of Np partitions as the ratio of En over En+E.

66. The apparatus as depicted in claim 64, wherein the predetermined manner performed by the rearrangement circuit includes step of: moving channels in a third sequence, corresponding to a partition within which the interference event is detected, toward end of the third sequence to obtain the hopping sequence.

67. The apparatus as depicted in claim 64, wherein the operation of the rearrangement circuit meets a regulation over band utilization in the frequency hopping spread spectrum communication system.

68. The apparatus as depicted in claim 64, wherein the operation of the rearrangement circuit meets a traffic requirement or a traffic characteristic in the frequency hopping spread spectrum communication system.

69. The apparatus as depicted in claim 68, wherein said traffic characteristic includes traffic pattern of a synchronous type and an asynchronous type.

70. The apparatus as depicted in claim 68, wherein said traffic requirement includes a reserved time slot for transmitting or receiving information.

71. A method for determining a hopping sequence for selecting a channel from M channels divided into Np partition to reduce probability of data collision in a frequency hopping spread spectrum (FHSS) communication system having a host apparatus, the host apparatus storing Q partition sequences and receiving a first sequence of M channels, M, Np and Q being positive integers, comprising the steps of:
    (a) measuring Np data collision ratios respectively corresponding to Np partitions, responsive to a RF signal, said Np data collision ratios having value of R(i), i being from 1 through Np and denoting an ith partition;
    (b) selecting a partition sequence from Q partition sequences, said partition sequence having a smallest value of a predetermined selection function H(p) to minimize the average probability of data collision, p being from 1 through Q and denoting a pth partition sequence;
    (c) mapping the first sequence of M channels to the selected partition sequence to produce a second sequence of M channels; and
    (d) responsive to a control signal, selecting one of the first sequence and the second sequence as the hopping sequence.

72. A method for determining a hopping sequence for selecting a channel from M channels divided into Np partitions to reduce probability of data collision in a frequency hopping spread spectrum (FHSS) communication system having a host apparatus, the host apparatus storing Q partition sequences and receiving a first sequence of M channels, M, Np and Q being positive integers, comprising the steps of:
    (a) responsive to a RF signal, detecting an interference event within the RF signal;
    (b) measuring Np data collision ratios respectively corresponding to Np partitions, responsive to the RF signal, said Np data collision ratios having value of R(i), i being from 1 through Np and denoting an ith partition;
    (c) selecting a partition sequence from Q partition sequences, said partition sequence having a smallest value of a predetermined selection function H(p) to minimize the average probability of data collision, p being from 1 through Q and denoting a pth partition sequence;
    (d) mapping the first sequence of M channels to the selected partition sequence to produce a second sequence of M channels;
    (e) responsive to a control signal, selecting one of the first sequence and the second sequence to obtain a third sequence;

(f) sorting R(i) of Np data collision ratios from a highest to a lowest to obtain T most interfered partitions, wherein T is a predetermined value; and (g) rearranging the third sequence to obtain the hopping sequence in a predetermined manner, as an interference event is detected in step (a) and the detected interference event occurs is within T most interfered partitions.

73. An apparatus, said apparatus determining a hopping sequence for selecting a channel from M channels divided into Np partitions to reduce probability of data collision in a frequency hopping spread spectrum (FHSS) communication system, the apparatus storing Q partition sequences and receiving a first sequence of M channels, M, Np and Q being positive integers, comprising:

a measurement circuit for measuring Np data collision ratios respectively corresponding to Np partitions, responsive to a RF signal, said Np data collision ratios having value of R(i), i being from 1 through Np and denoting an ith partition;

a first selector for selecting a partition sequence from Q partition sequences, said partition sequence having a smallest value of a predetermined selection function H(p) to minimize the average probability of data collision, p being from 1 through Q and denoting a pth partition sequence;

a mapping circuit for mapping the first sequence of M channels to the selected partition sequence to produce a second sequence of M channels; and a second selector, responsive to a control signal, for selecting one of the first sequence and the second sequence as the hopping sequence.

74. An apparatus, said apparatus determining a hopping sequence for selecting a channel from M channels divided into Np partitions to reduce probability of data collision in a frequency hopping spread spectrum (FHSS) communication system, the apparatus storing Q partition sequences and receiving a first sequence of M channels, M, Np and Q being positive integers, comprising:

a detector circuit, responsive to a RF signal, for detecting an interference event within the RF signal;

a measurement circuit for measuring Np data collision ratios respectively corresponding to Np partitions, responsive to the RF signal, said Np data collision ratios having value of R(i), i being from 1 through Np and denoting an ith partition;

a first selector for selecting a partition sequence from Q partition sequences, said partition sequence having a smallest value of a predetermined selection function H(p) to minimize the average probability of data collision, p being from 1 through Q and denoting a pth partition sequence;

a mapping circuit for mapping the first sequence of M channels to the selected partition sequence to produce a second sequence of M channels;

a second selector, responsive to a control signal, for selecting one of the first sequence and the second sequence to obtain a third sequence;

a sorting circuit for sorting R(i) of Np data collision ratios from a highest to a lowest to obtain T most interfered partitions, wherein T is a predetermined value; and a rearrangement circuit for rearranging the third sequence to obtain the hopping sequence in a predetermined manner, as an interference event is detected by the detector circuit and the detected interference event occurs is within T most interfered partitions.

75. A method for determining a hopping sequence for selecting a channel from M channels divided into Np partitions to reduce probability of data collision in a frequency hopping spread spectrum (FHSS) communication system having a host apparatus, the host apparatus storing Q partition sequences and receiving a first sequence of M channels, M, Np and Q being positive integers, comprising the steps of:

(a) responsive to a RF signal, detecting an interference event within the RF signal;

(b) measuring Np data collision ratios respectively corresponding to Np partitions, responsive to the RF signal, said Np data collision ratios having value of R(i), i being from 1 through Np and denoting an ith partition;

(c) selecting a partition sequence from Q partition sequences, said partition sequence having a smallest value of a selection value H(p), wherein the selection value is a summation of R(i)* number of occurrence of the ith partition in each of Q partition sequences, p being from 1 through Q and denoting a pth partition sequence;

(d) mapping the first sequence of M channels to the selected partition sequence to produce a second sequence of M channels;

(e) responsive to a control signal, selecting one of the first sequence and the second sequence to obtain a third sequence;

(f) rearranging the third sequence to obtain the hopping sequence in a predetermined manner, as an interference event is detected in step (a).

76. An apparatus, said apparatus determining a hopping sequence for selecting a channel from M channels divided into Np partitions to reduce probability of data collision in a frequency hopping spread spectrum (FHSS) communication system, the apparatus storing Q partition sequences and receiving a first sequence of M channels, M, Np and Q being positive integers, comprising:

a detector circuit, responsive to a RF signal, for detecting an interference event within the RF signal;

a measurement circuit for meaning Np data collision ratios respectively corresponding to Np partitions, responsive to the RF signal, said Np data collision ratios having value of R(i), i being from 1 through Np and denoting an ith partition;

a first selector for selecting a partition sequence from Q partition sequences, said partition sequence having a smallest value of a selection value H(p), wherein the selection value is a summation of R(i)* number of occurrence of the ith partition in each of Q partition sequences, p being from 1 through Q and denoting a pth partition sequence;

a mapping circuit for mapping the first sequence of M channels to the selected partition sequence to produce a second sequence of M channels;

a second selector, responsive to a control signal, for selecting one of the first sequence and the second sequence to obtain a third sequence; and a rearrangement circuit for rearranging the third sequence to obtain the hopping sequence in a predetermined manner, as an interference event is detected by the detector circuit.

* * * * *